(12) United States Patent
Gleason

(10) Patent No.: US 6,644,355 B1
(45) Date of Patent: Nov. 11, 2003

(54) DIFFUSING CORNER FOR FLUID FLOW

(75) Inventor: Mark E Gleason, Farmington Hills, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 4 days.

(21) Appl. No.: 10/324,647

(22) Filed: Dec. 19, 2002

(51) Int. Cl.[7] .................................................. F15D 1/04
(52) U.S. Cl. ........................ 138/37; 138/39; 137/561 A
(58) Field of Search ....................... 138/37, 39, DIG. 4, 138/DIG. 10; 137/561 A; 244/23 D; 415/208.1

(56) References Cited

U.S. PATENT DOCUMENTS

| 3,602,262 | A | * | 8/1971 | Hinden | 138/39 |
| 4,586,540 | A | * | 5/1986 | DeLord | 138/39 |
| 4,641,684 | A | * | 2/1987 | DeLord | 137/561 A |
| 4,911,205 | A | * | 3/1990 | Myers | 138/39 |
| 4,919,170 | A | * | 4/1990 | Kallinich et al. | 138/39 |
| 4,995,426 | A | * | 2/1991 | Hinden | 138/39 |
| 5,405,106 | A | * | 4/1995 | Chintamani et al. | 244/23 D |
| 5,529,092 | A | * | 6/1996 | Arnoldt | 138/39 |
| 5,687,768 | A | * | 11/1997 | Mull et al. | 138/39 |
| 5,927,339 | A | * | 7/1999 | Ellis et al. | 138/39 |
| 6,244,300 | B1 | * | 6/2001 | Pacana | 138/39 |

* cited by examiner

Primary Examiner—Patrick Brinson
(74) Attorney, Agent, or Firm—Donald J. Wallace

(57) ABSTRACT

A diffusing corner for fluid flow within a wind tunnel comprising an arrangement of diffusing vanes for diverting the flow of air through the corner in a plurality of air passages having increasing cross-sectional area, thereby increasing the overall cross-sectional area of the wind tunnel and slowing the air flow. The vanes are configured to minimize turbulence and the loss of energy through the corner, and to attenuate transmission of sound generated within the wind tunnel.

10 Claims, 3 Drawing Sheets

— CUBIC
— CONSTANT OFFSET
— EXPANDING OFFSET

DIFFUSING CORNER FOR FLUID FLOW

CROSS-REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates generally to fluid flow systems. In one of its aspects, the invention relates to the control of fluid flow in a wind tunnel system.

2. Description of Related Art

Generally, the purpose of a wind tunnel is to measure the effect of the passage of a high velocity fluid, in this case air, over a body under controlled conditions. Such body may be an airplane, a building structure or an automobile.

In a wind tunnel, the prime consideration is to be able to control the velocity and the uniformity of the air flow. One very impractical method of doing this is to have a very long straight wind tunnel with the right combination of cross-sectional area and input wind generation power. This is impractical because each end of such a wind tunnel must be open to the atmosphere. Therefore, the common practice is to make the wind tunnel a loop so that no make up air is needed, debris can be prevented from entering the tunnel, energy is conserved, and other factors, such as air temperature, can be controlled.

In the past, it may have been a relatively simple matter of making a wind tunnel in a large loop. Perhaps the corners would be rounded, or perhaps some curved vanes would be placed in the corners to somewhat reduce the energy lost and the turbulence created in the corners. In a wind tunnel used only to determine forces of the wind on a body, and the aerodynamic effects, e.g. drag, on the body, the noise of turbulence occurring somewhere in the tunnel was less of an issue.

However, in a wind tunnel that is to be used for testing the acoustic effects of fluid flow over a body, the fluid flow must be "purified" to isolate the acoustic effects created by the tunnel from those created by the flow of fluid over the test body itself. The goal is therefore to minimize the "noise" generated by the wind tunnel itself. This "noise", from the testing standpoint, involves both the actual audible noise generated by a wind generator (fan/turbine) and the noise created by the turbulence of the fluid flow as it traverses the passageways, transitions and corners of the tunnel.

For the purposes of aerodynamic and acoustic evaluation of solid bodies, it would be advantageous to provide a wind tunnel assembly that minimizes the noise generated and attributable to the wind tunnel itself. It would also be preferable to reduce the energy lost to inefficient corners and transitions so as to reduce the power consumption required to generate a given capacity for air movement.

BRIEF SUMMARY OF THE INVENTION

The present invention provides a diffusing corner for fluid flow within a fluid conduit, comprising a plurality of vanes arranged to divide the fluid conduit into a plurality of fluid passages, each of the plurality of vanes having a first surface and a second surface, the first and second surfaces being defined by non-circular sections, wherein the second surface of a first vane and the first surface of a second vane define one of the plurality of fluid passages, and wherein the plurality of vanes is arranged to direct the fluid flow through an angular displacement and an increase in cross-sectional area of the fluid conduit.

BRIEF DESCRIPTION OF THE SEVERAL VIEWS OF THE DRAWINGS

The present invention will become more fully understood from the detailed description and the accompanying drawings, wherein.

DETAILED DESCRIPTION OF THE INVENTION

Figure 1:
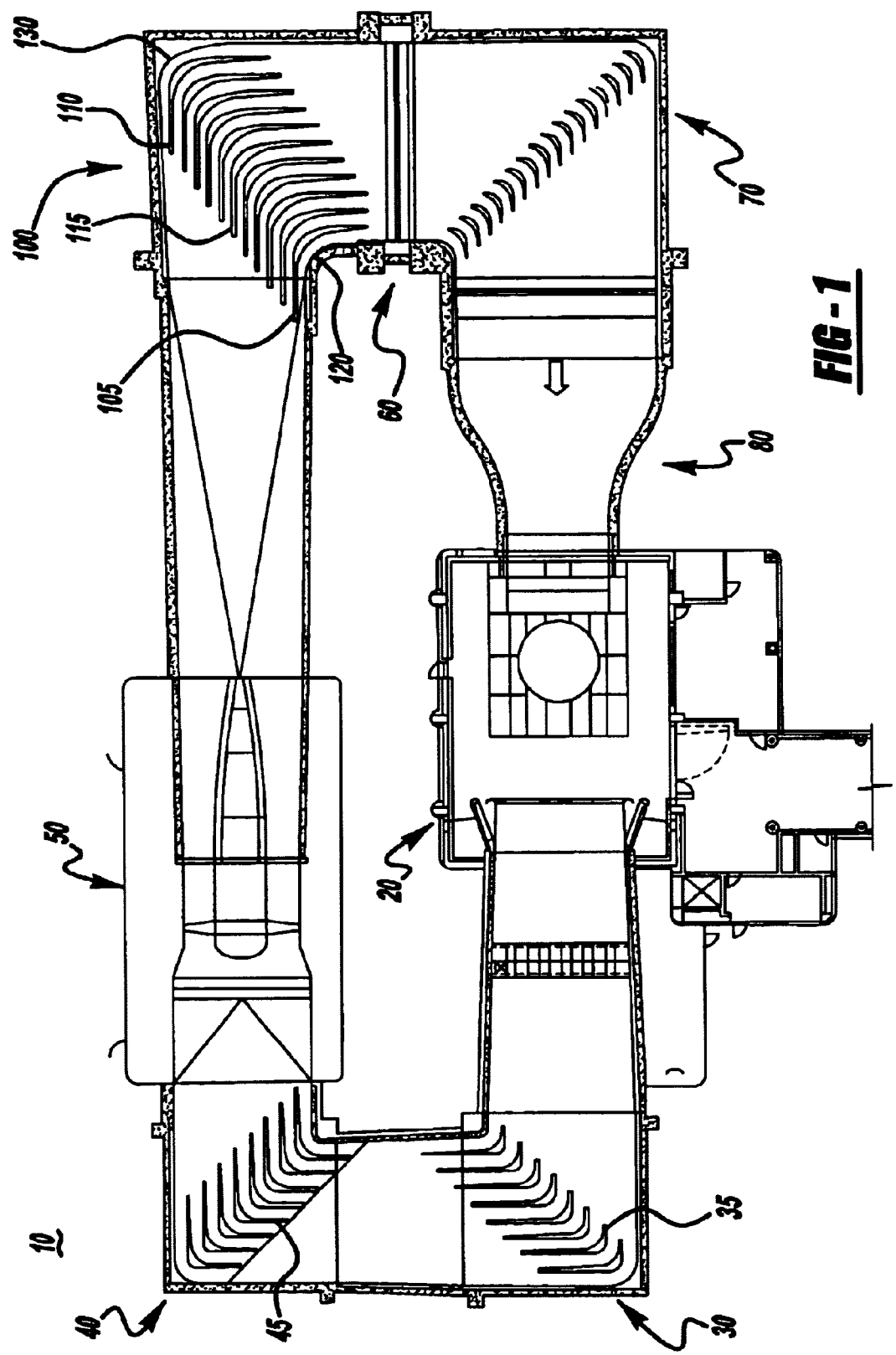
FIG. 1 is a plan view of an aero-acoustic wind tunnel having a diffusing corner according to the invention.
Figure 2:
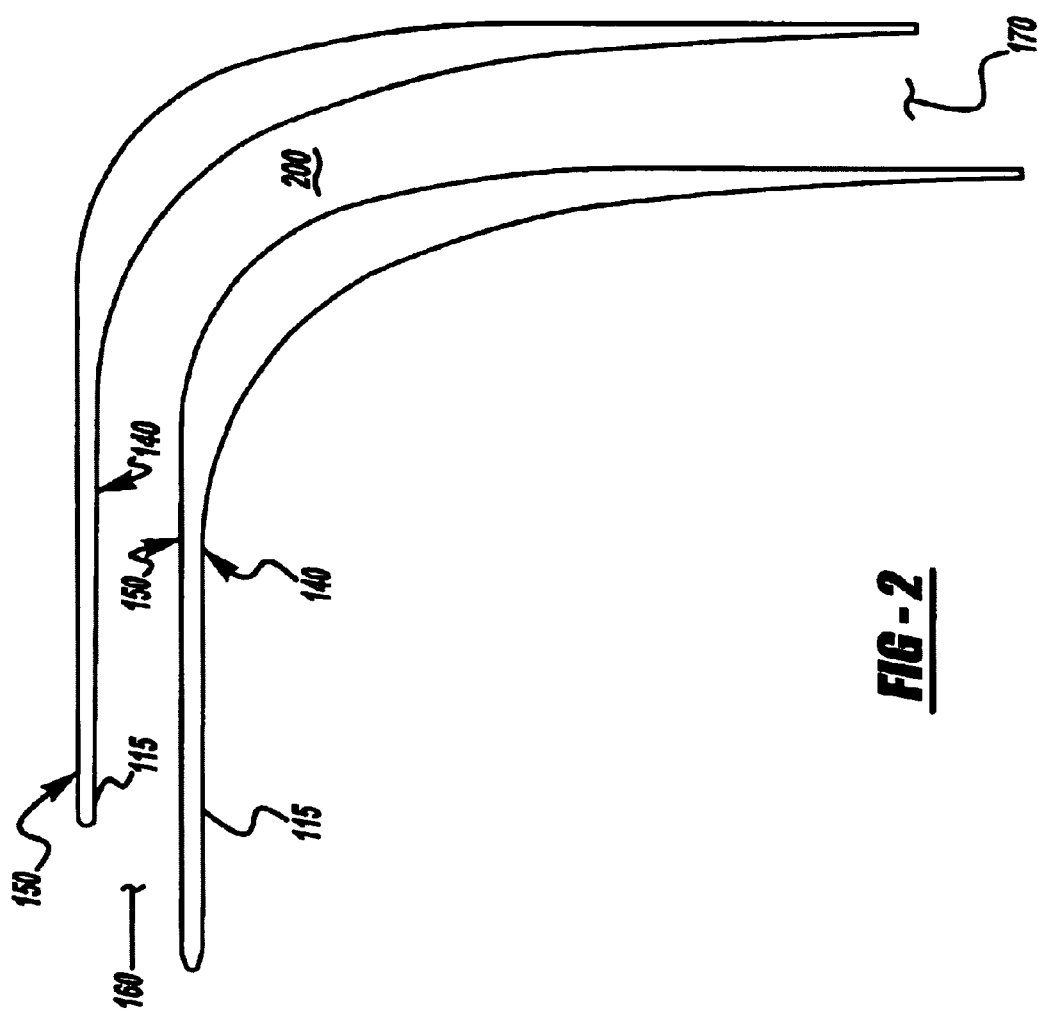
FIG. 2 is a plan view of a pair of diffusing corner vanes from the aero-acoustic wind tunnel of FIG. 1.

An aero-acoustic wind tunnel 10 having a diffusing corner 100 according to the invention is shown in FIGS. 1–2. Referring with particularity to FIG. 1, the aero-acoustic wind tunnel 10 is formed in a closed loop for environmental control of the air flow. Air flows in this aero-acoustic wind tunnel 10 in a clockwise direction.

Beginning with the test section 20, the air flows to the first corner 30 and second corner 40, which contain substantially conventional turning vanes 35, 45, for redirecting the air flow around each corner. The turning vanes 35, 45, as well as the walls of each corner 30, 40 include acoustically insulating surfaces. From the second corner 40, the flow of air then passes through the flow generator 50. Flow generator 50 can comprise a fan blade/stator arrangement of conventional design.

After the flow generator 50, the flow of air then enters the third, diffusing corner 100. Diffusing corner 100 includes an inner wall 120 and an outer wall 130. An innermost diffusing vane 105 is positioned next to inner wall 120. An outermost diffusing vane 110 is positioned next to outer wall 130. A plurality of interior diffusing vanes 115 are positioned equidistant between innermost vane 105 and outermost vane 110.

After passage through the diffusing corner 100, the air flows at a reduced velocity to pass through a heat exchanger 60 and fourth corner 70. After passing around fourth corner 70, the air flow passes through nozzle section 80 to increase its speed to the desired test speed, at which it re-enters the test section 20.

Referring again to the third, diffusing corner 100, and with particularity to FIG. 2, an air passage 200 is formed between each pair of adjacent vanes 105, 115, 110. Inner wall 120 is configured to cooperate with innermost diffusing vane 105 to form a like air passage 200. Outer wall 130 likewise is configured to cooperate with outermost diffusing vane 110 to form a like air passage 200.

As shown in FIG. 2, each vane 115 has an inner surface 140 and an outer surface 150. The air passage 200 is defined by the outer surface 150 of a first vane 115 and the inner surface 140 of the next outwardly positioned vane 115. Inner wall 120 of the diffusing corner 100 substantially matches the profile of the outer surface 150 of a vane 115 so as to cooperate with innermost vane 105 to form the air passage 200. Likewise, outer wall 130 matches the profile of an inner surface 140 to cooperate with outermost vane 110 to form an air passage 200.

Each air passage 200 has an upstream entrance 160 and a downstream exit 170. Each entrance 160 of the plurality of air passages 200 is substantially equal in width. Each exit 170 of the plurality of air passages 200 is also substantially equal in width, and is wider than the entrance 160 to provide an overall increase in air passage cross-sectional area, as will be further discussed below.

Normally in ducts of this type, circular arcs are used, which, when intersecting with walls that are straight, cause an adverse pressure gradient resulting in flow separations on the wall, poor flow uniformity, flow pulsation and a degradation in flow efficiency. By utilizing higher order curves such as ellipses, conics or cubics, the degree of adverse pressure gradient is greatly reduced, minimizing the possibility of flow separation on the corners or on the vane surfaces themselves.

The diffuser function of the corner and vanes design is not normally done in conjunction with the turning function. It is conventional wisdom that you cannot turn and diffuse the flow at the same time. This however has been proven not to be true when the disclosed design is utilized. Each of the passages between the vanes, between the inner vane and the inner wall surface, and between the outer vane and the outer wall surface, is a high aspect ratio (small width and long length) diffuser which can be configured with a constant angle of diffusion or a variable angle of diffusion. By breaking down the diffusion into these several passages, the desired degree of duct expansion and flow deceleration can be accomplished in a much shorter length than would be the case with a single flow passage.

The diffusing corner for fluid flow according to the invention uses higher order mathematically formulated curves to define the profile of the transition regions between the upstream and downstream wall angles of the inner and outer walls of the duct. Instead of using a circular arc, an ellipse, cubic or conic is utilized. The contour of the curved transition of the inner corner of the duct forms the shape of the outer surface of multiple turning vanes which are inserted into the flow. The contour of the curved transition of the outer corner of the duct is also a higher order curve such as an ellipse, a cubic or conic, and forms the inner surface of the vanes inserted into the flow. This contour is defined by mathematically formulating the surface of an expanding channel whose inner surface is defined by the curved transition on the inner wall of the duct. This expansion can be constant or variable in degree of expansion along the length of the turning vanes. By defining the amount of expansion or area change desired, the maximum degree of expansion allowed and the distance available, the corner will naturally result in a certain number of these curved vanes being inserted between the inner and outer walls of the corner.

The new method employed in generating the contours of the corner and vane curves is composed of the following steps:
A. Determining the passage width of the duct upstream of the corner.
B. Determining the minimum width of the upstream end of the vanes to be used from structural or acoustic considerations.
C. Determining the desired width of the duct downstream of the corner.
D. Determining the number of vanes/passages needed to accomplish the desired width/area change between the upstream portion of the duct and the downstream portion of the duct. Keeping in mind the high aspect ratio desired, there is a balance between the minimum number of vanes necessary (or a maximum air passage width) to keep the required length of the vanes down, while still having the air passages long enough keep the diffusion angle between vanes low enough to avoid flow separation.
E. Designing/calculating the surfaces of the vanes:
  1. Selecting the major and minor half axis lengths of the cubic curve to be used for the inside corner transition.
  2. Mathematically generating the points along the contour of the curve according to the equation $x^3/a + y^3/b = 1$.
  3. Finding the slope of the curve at each of the points describing the generated cubic curve.
  4. Generating a normal to the curve at each point.
  5. Selecting a nominal offset of the outside passage curve, which is the upstream distance between the vane surfaces.
  6. Mathematically generating the point locations for the simply offset curve.
  7. Selecting the amount of diffusion angle desired to take place in the passage between vanes and determining if this diffusion angle will be constant or variable. A nominal diffusion angle of around 2.5 to 3 degrees is generally desirable.
  8. If the diffusion angle is to be variable, defining the mathematical formulation which yields the diffusion angle at each point.
  9. Mathematically determining the coordinates of each of the points defining the offset plus diffusion curve, which is the inner curve of the turning vane and the curve utilized between the outside walls at the intersection.
  10. Constructing the inner and outer corners of the duct and the vane contours with the mathematically defined curves.

Figure 3:
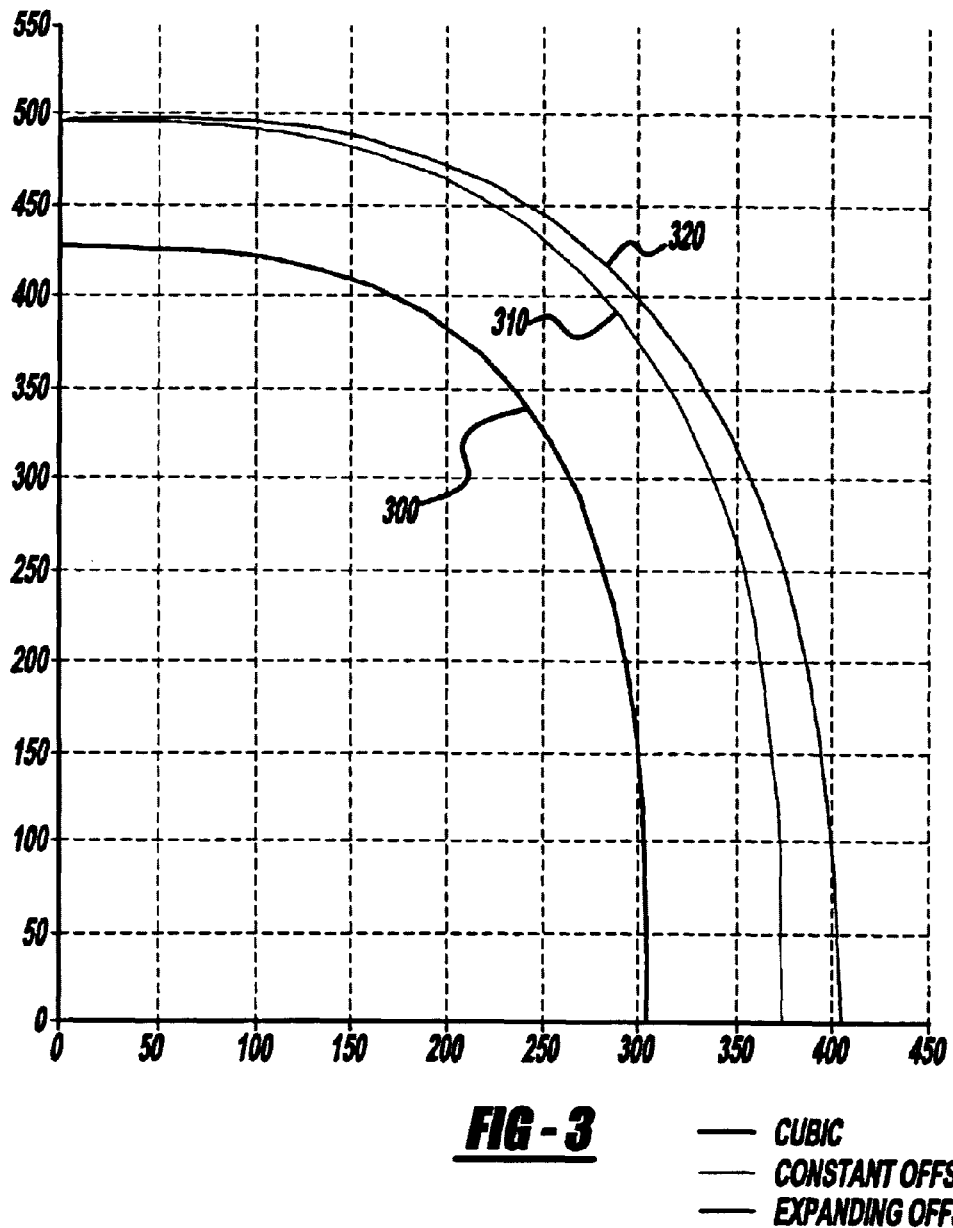
FIG. 3 is a graphic representation of the mathematic formulation of the surface of the diffusing corner vanes of FIGS. 1–2.

FIG. 3 depicts graphically the coordinates of the resultant cubic curve 300, the constant offset curve 310, and the expanding offset curve 320. The new result is that the flow is turned the desired angle, in this application 90 degrees and the area of the duct is increased by approximately 40% within the area of the corner between the inner cubic curve 300 and the expanding offset curve 320. These two effects are accomplished while maintaining good flow uniformity and with much less pressure loss than would be the case for a corner with conventional vanes and a separate area of diffusion.

It is also advantageous to introduce sound dampening in the air passages, particularly in the surface of the vanes, to attenuate the acoustic noise generated by the fluid flow generator.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the scope of the appended claims.

What is claimed is:

1. A diffusing corner for fluid flow within a fluid conduit, comprising a plurality of vanes arranged to divide the fluid conduit into a plurality of fluid passages, each of the plurality of vanes having a first surface and a second surface, the first and second surfaces being defined by non-circular sections, wherein the second surface of a first vane and the first surface of a second vane define one of the plurality of fluid passages, and wherein the plurality of vanes is arranged to direct the fluid flow through an angular displacement and an increase in cross-sectional area of the fluid conduit.

2. The diffusing corner for fluid flow of claim 1, wherein one of the plurality of fluid passages is formed between one of the first and second surface of one of the plurality of vanes and a wall of the fluid conduit.

3. The diffusing corner for fluid flow of claim 2, wherein the plurality of fluid passages are equal in cross-sectional area.

4. The diffusing corner for fluid flow of claim 1, wherein the plurality of fluid passages are equal in cross-sectional area.

5. The diffusing corner for fluid flow of claim 1, wherein the non-circular sections are cubic sections.

6. The diffusing corner for fluid flow of claim 1, wherein the non-circular sections are conic sections.

7. The diffusing corner for fluid flow of claim 1, wherein the angular displacement is 90 degrees.

8. A vane within a fluid passage, the vane having inner and outer surfaces, each of the inner and outer surfaces being defined by non-circular sections and configured to divert a fluid flow through an angular displacement within the fluid passage, and adapted to be arranged with other like vanes within the fluid passage to increase the cross-sectional area of the fluid passage, thereby reducing the fluid velocity in a continuous fashion so as to minimize turbulent flow and energy loss due to turbulence.

9. The vane of claim 8, wherein the non-circular sections are cubic sections.

10. The vane of claim 8, wherein the non-circular sections are conic sections.

* * * * *